Sept. 30, 1941.　　　M. F. MOORE　　　2,257,638
HEATING
Filed Feb. 10, 1939　　　3 Sheets-Sheet 1

INVENTOR.
MEADE F. MOORE
BY Carl J. Barbee
ATTORNEY.

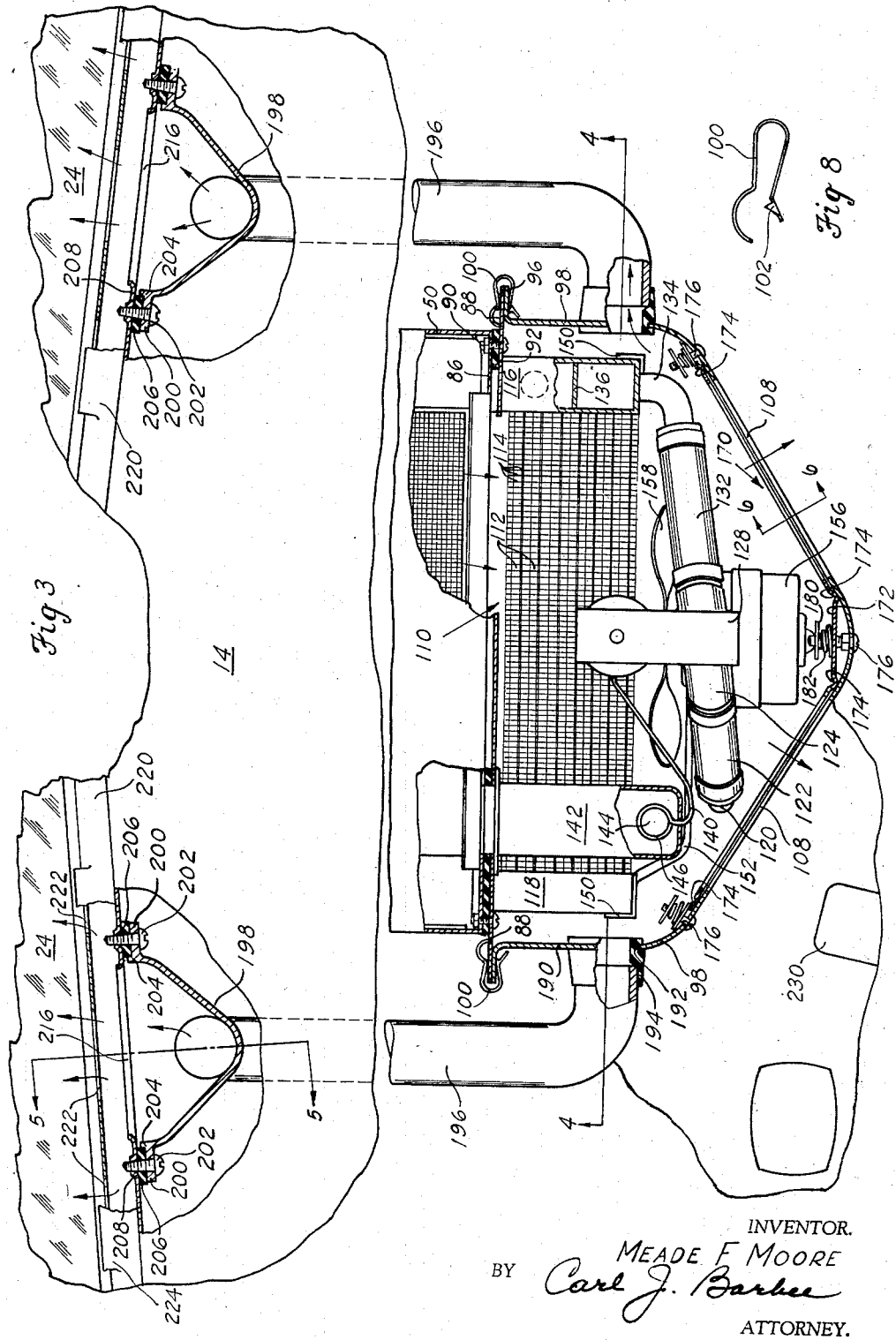

Sept. 30, 1941.  M. F. MOORE  2,257,638
HEATING
Filed Feb. 10, 1939  3 Sheets-Sheet 3
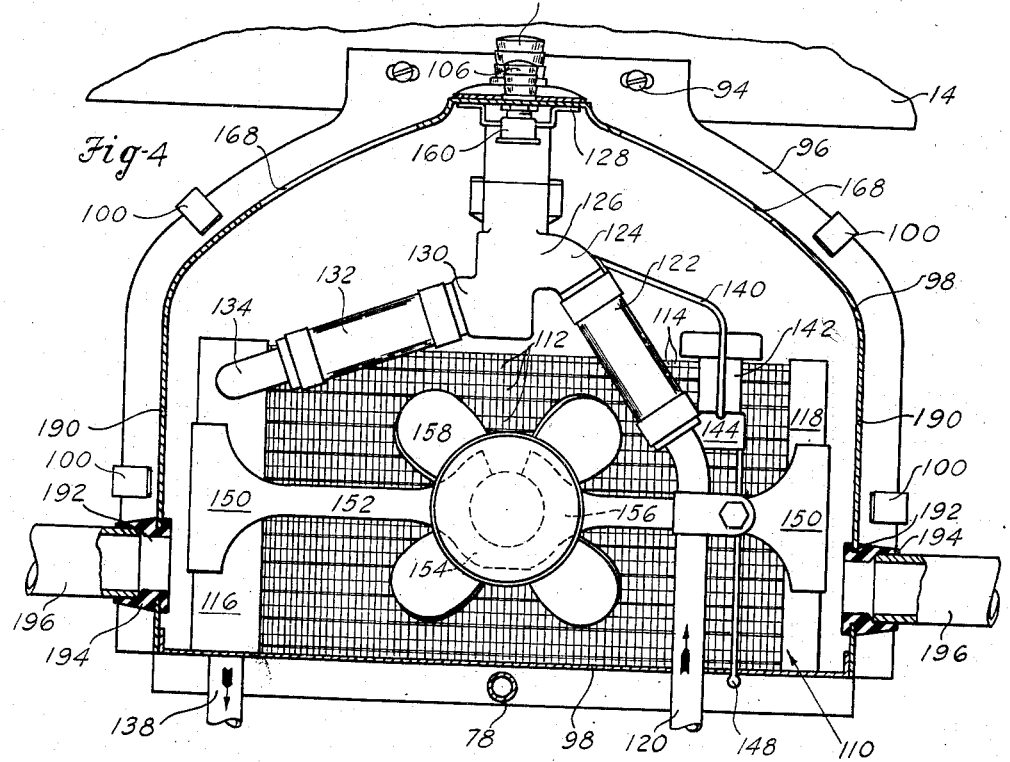
INVENTOR.
MEADE F. MOORE
BY Carl J. Barbee
ATTORNEY.

Patented Sept. 30, 1941

2,257,638

UNITED STATES PATENT OFFICE 2,257,638

HEATING

Meade F. Moore, Kenosha, Wis., assignor to Nash-Kelvinator Corporation, Kenosha, Wis., a corporation of Maryland Application February 10, 1939, Serial No. 255,596

6 Claims. (Cl. 237—1)

This invention relates to the art of heating and has particular reference to that branch of this art which deals with the heating and ventilating of the interior of automotive vehicles.

Devices for warming the air or warming the interior or passenger space of an automotive vehicle are very well known, but such devices in the past have, in the main, been confined to structures which heat the air which is already present in the vehicle and simply recirculate such air through the vehicle interior after heating it. There have been several exceptions to this general rule, notably, devices which depend upon circulation of air under the impetus of the motor cooling fan, such air being passed through an exhaust manifold heater prior to delivery to the vehicle interior. A limited number of devices have employed the heated cooling fluid from the radiator of a vehicle for the purpose of heating air taken in through a cowl ventilator prior to discharging the same into the vehicle interior.

It is an object of this invention to utilize all of the advantages which are inherent in the latter type of heater in order to provide a vehicle heating and ventilating system which will operate in such a manner as to provide uniform comfort conditions within the vehicle throughout the entire range of cold weather conditions which the vehicle may encounter during its use.

An additional object of the invention is to provide a heater of this nature which is easily installed, economical to manufacture, and which will have a low operating cost.

It is a further object of the invention to provide a heating element for warming air passing thereacross to a uniform temperature over the entire cross section of the heating element.

A still further object of the invention is to provide, in a heating and ventilating device of the class above described, means for securing a uniform and even distribution of the air discharged therefrom throughout the vehicle interior.

A further object of the invention is to provide means whereby the warm air issuing from the heater may be conducted to points adjacent the windshield for the purpose of defrosting the same.

A further object of the invention is to provide a heater of the class described which will have adequate capacity and yet which is so designed that its bulk does not interfere with the proper manipulation of pedals or levers such as are necessary to the operation of the vehicle.

Additional objects and advantages of the invention will appear more fully hereinafter as the description proceeds and will be pointed out more completely in connection with the appended claims.

In the drawings, of which there are three sheets, and which are to be taken as illustrative and not as limiting the invention:

Figure 3 is a vertical transverse sectional view through the heater shown in Figures 1 and 2, certain parts being broken away and others being shown in section more clearly to illustrate the invention;

Figure 4 is a horizontal sectional view taken substantially upon planes, as indicated by the broken line 4—4 of Figure 3, and looking in the direction of the arrows;

Figure 5 is a vertical sectional view through a portion of the defroster mechanism, taken upon a plane as indicated by line 5—5 of Figure 3 and looking in the direction of the arrows;

Figure 6 is a detail sectional view through the heater casing and shutter mechanism therefor, taken substantially upon a plane as indicated by the line 6—6 of Figure 3 and looking in the direction of the arrows;

Figure 7 is a detail sectional view showing the connection of the water shed and filter element to the interior of the heater casing, such view being taken upon a plane, as indicated by the line 7—7 of Figure 2, and looking in the direction of the arrows; and, Figure 8 is a detail view of a clip used to attach the lower casing to the upper casing.

Figures 1, 2:
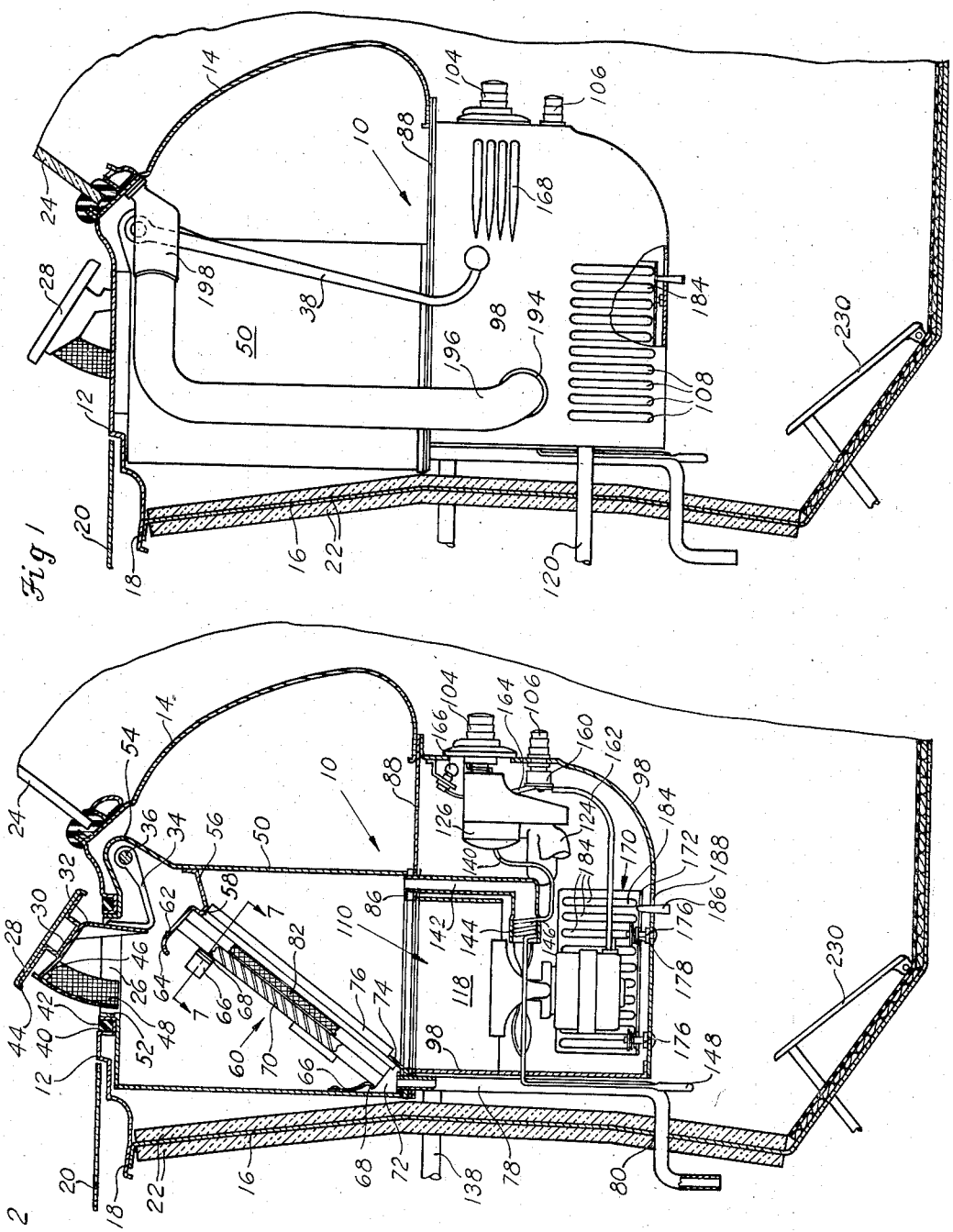
Figure 1 is a vertical sectional view through a portion of the dash, cowl and instrument panel of an automotive vehicle showing the device of the present invention in side elevation.
Figure 2 is a vertical longitudinal sectional view similar to Figure 1 but taken through the heater device shown in Figure 1.

Referring more specifically to the drawings in which similar reference characters are employed to designate similar parts, the device is shown as being embodied in a two part casing 10 which is adapted to be received under the cowl 12 of an automotive vehicle, forwardly of the instrument panel 14, and rearwardly of the dash 16. Dash 16 may comprise a metal panel secured in any suitable manner at its upper end to a forwardly flanged portion 18 of the cowl which is adapted to be concealed by the hood 20 of the vehicle. The dash 16 may be provided with suitable heat and noise insulating panel members 22 which are adapted to exclude the heat and noise originating in the motor compartment of the vehicle from the passenger compartment.

The cowl in its uppermost portion and just forwardly of the usual windshield 24 may be provided with an opening 26 through which incoming air may be entrained by means hereafter to be described. A cover 28 is provided for closing the cowl opening, said cover 28 having attached to its underside 30 by any suitable means a rearwardly and downwardly projecting baffle or skirt 32 which serves to deflect the air striking the same downwardly into the heater case 10. The skirt 32 has attached to its rear side a lever 34 mounted rigidly upon a rock shaft 36, such rock shaft being adapted to be operated to raise and lower the cover 28 by means of a manually operated lever 38 (Figure 1) which projects below the bottom of the instrument panel 14 to a position in which it is readily manually operable. Suitable friction means (not shown) bearing upon the shaft 36 may be provided for retaining the cowl opening cover 28 in its adjusted position.

Adjacent the cowl intake opening 26 the cowl 12 is provided with downwardly offset portions 40 which form a channel for the reception of suitable gasket material 42 against which downwardly flanged edges 44 of the cowl cover 28 are adapted to seat to exclude air and moisture and to prevent rattling of these two parts when the cover 28 is in closed position. Baffle 32 may have suitably secured to its forward edge, as at 46, a screen 48 to prevent the entrance of relatively large foreign objects into the heater casing by way of the cowl opening 26. It will be understood that the closure operating shaft 36 is pivoted within the heater casing 10 and that it is suitably sealed against the passage of air therealong at the point where it emerges from the casing 10.

As previously indicated, the casing 10 is made up of two parts, the upper portion 50 of which is generally rectangular in outline, but provided with a flanged opening in its upper portion; the flanges 52 of which are received within the opening 26 in the cowl so as to engage tightly therewith. The flanges 52 may be secured to the flanged edges of the cowl opening as by bolts or if desired by spot welding. Upper casing 50 has a projecting corner 54 which is adapted to extend around and enclose the operating shaft 36 for cover 28.

A clip 56 secured as by welding to the interior of the upper casing 50 extends entirely across the rear portion of the casing 50 and has a flanged forward edge 58 to provide a surface against which there may be received a combined filter and water separator 60. Member 56 is also extended upwardly and forwardly as at 62 to provide a shoulder for receiving and centering the upper edge of the combined separator and filter 60, and is provided with a downwardly turned end 64 to prevent accidental displacement of the filter and separator 60. Spring clips 66 are provided upon the interior of the casing 50 and have fingers 68 for engaging the upper surface of the separator and filter 60 for retaining the same in position. Clips 66 may be secured to stop members 67 (as shown in Figure 7), which are secured to the interior of casing 50, and said stop members may have upturned portions 69 against which the separator 60 rests.

The separator plate 70 comprises a metal panel which has formed therein a series of downwardly opening louvers, which comprises in effect, a single-roof arrangement for shedding water which may come into contact therewith as by the passage of moisture laden air through the casing 50. A separator plate of this particular type is disclosed more in detail in the co-pending application of Meade F. Moore, Serial No. 188,712, filed February 4, 1938, for Heating and ventilating systems for automobiles.

The louvers 70 are adapted to discharge the moisture collected thereon downwardly into a trough 72 which is formed in the lower forward corner of the casing 50 by means of an upturned flange 74 upon the open lower end of the casing 50. Flange 74 also serves to provide a stop against which the bottom edge of the filter element and its supporting frame 76 are positioned. The drainage trough 72 has connected thereto a flexible tube 78, which passes through an aperture 80 in the dash 16 and the insulating panels 22 for discharging moisture accumulated in the trough 72 into the motor compartment and hence to the exterior of the vehicle.

Filter 82 may be of any desired type for straining dust, pollen or other impurities from the air entering the vehicle. It is also contemplated that poisonous gas absorptive materials, such as activated carbon, could be employed in the place of this filter or in addition to it so as to constitute a gas-proof shelter within the vehicle in the event of gas attacks in wartime.

Referring to Figure 3, it will be recognized that the casing 50 is inwardly flanged at its lower edge along its sides to provide seats 86 upon which there is secured a plate 88 by means of bolts 90. Bolts 90 may extend through a gasket or separator 92, which performs the function of sealing the parts 86 and 88 to one another and preventing any rattling thereof. Plate 88 (see Figure 2) also extends rearwardly and laterally of casing 50 and is secured by bolts 94 (Figure 4) at its rearmost portion to the underside of the instrument panel 14 in order to provide additional stability and support for the heater casing 10. Bolts 94 are also employed to secure the upper flanged edge 96 of the lower casing 98 to the instrument panel 14, the remainder of the flange 96 being secured to the plate 88 by means of spring clips 100 which have a burr or spur 102 (see Figure 8) upon an inside portion thereof to prevent their accidental withdrawal from their enclosing position about the edges of the members 96 and 88. The rearmost portion of the casing 98 accordingly extends to a position just forward of the exposed face of the instrument panel and therebeneath so that an adjusting handle 104 and a switch handle 106 carried by casing 98 may readily be operated by an individual seated within the vehicle. The bottom portion of the casing 98 has a wide wedge shape in which is provided a series of slotted apertures 108 by means of which the heated air from the casing 98 is exhausted in such a manner as to distribute it equally from both sides of the heater.

The supporting plate 88 also has other functions; that is, to provide for support of the heat exchange element indicated generally at 110 and to define a baffle for causing substantially all of the air to flow through such heat exchanger. The heat exchange element 110 comprises a tubular radiator core made up of tubes 112 having fins 114 extending thereacross so as equally to divide the air passing therethrough and to cause it to flow closely adjacent the tubes, as well as to increase the radiating surface of the tubes 112. Opposite ends of the tubes 112 are received in tanks or headers 116 and 118, which tanks are supported at their upper ends by means of a brazed, welded or soldered connection to the under side of plate 88. The heating medium for the radiator 110 is the motor cooling medium which is present in all modern motor vehicles. Suitable connections are employed whereby the heated cooling medium is taken off from the outlet or hot side of the cooling liquid jacket of the internal combustion motor and flows through a tube 120 which extends through the dash 16 and an aperture in the front wall of the casing 98. A section of flexible tubing 122 connects the delivery end of the conduit 120 to the intake end 124 of a thermostatically actuated regulating valve 126, supported on a plate 128 which is secured to the rear wall of the casing 98 in any suitable manner. The outlet end 130 of the regulating valve 126 is connected through a flexible coupling 132 to the inlet end 134 of the heat exchanger 110. The inlet 134 is connected to the bottom of tank 116 which has positioned therein a baffle 136 (Figure 3) for the purpose of preventing flow of the heating medium toward the tank 118 except through the lower half of the tubes 122, return of the heating medium from the tank 118 to the tank 116 being accomplished through the remaining or upper half of the tubes 112. From the forward upper portion of the tank 116 a tube 138 connects with a flexible conduit (not shown) for returning the spent or cooled liquid to the water circulating system of the motor.

The thermostatically actuated regulating valve 126 may comprise any desired type of automatically actuated valve, but it is here shown as adapted to be opened or closed in accordance with the requirements which are imposed as hereinafter described. The valve may comprise a suitable bellows or "sylphon" with a section of flexible metallic tubing 140 attached thereto, said "sylphon" and tubing forming a closed chamber within which a charge of refrigerant, under approximately .5 lbs. per square inch pressure, is sealed. The tubing 140 extends to a point within an enlarged portion 144 of a sampler tube 142, supported at its upper end upon the inwardly flanged lower edge 86 of the case 50, and in a position to take in a sample of the cleaned and dehydrated air issuing from the filter and separator. The tube 140 is coiled within the enlarged portion 144 of the sampler 142, as at 146, and the free end of the refrigerant filled tube 140 extends outside of the casing 98 where it terminates in a bulb 148 projecting into the interior of the vehicle. The control tube 140 and bulb 148, together with the coil 144, serve to detect the temperature existing within the vehicle and the temperature of the incoming air for adjusting the degree of opening of the water valve 126 by reason of the change of refrigerant pressure within the tube and "sylphon." This control functions to increase the opening of the water valve 126 in the event of a temperature drop either within the vehicle or in the incoming air, or conversely reduces the water flow through the valve 126 in the case of an increase of the temperature either within the vehicle or in the incoming air. By this means there is a constant adjustment of the valve 126 to compensate for variations in the temperature of the incoming air and yet this valve serves to prevent an undue fluctuation of the temperature within the vehicle by reason of the bulb 148. Since the valve is set to pass a given quantity of hot water in normal operation, the temperature of the air within the vehicle will remain the same at all times due to its opening and closing movements.

Provision is also made for manual adjustment of the setting of the valve 126 by means of the control knob 104 which varies the compression of loaded springs for controlling the movement of the bellows or "sylphon." These parts are not illustrated as they are all extremely well known, particularly in the art of refrigeration control.

To the bottom portion of each of the tanks 116 and 118, there is secured, by welding or soldering, a fixture 150, said fixture 150 constituting the end portions of a bracket 152, which has an annular central portion 154 for supporting a motor 156 adapted to drive a fan 158. It is contemplated that the fan will not be constantly in use inasmuch as the forward motion of the vehicle will serve to entrain sufficient air (particularly at speeds ranging upwards of 20 miles per hour) for all heating purposes of the vehicle. At speeds below 20 miles per hour, it is necessary that some additional means be employed for circulating the air from the exterior of the vehicle through the heating element, as insufficient air will be entrained for heating purposes at low speeds or when the vehicle is standing. The fan may be operated at the will of the vehicle operator by means of a rheostat switch 160 secured to the rear wall of the casing 98 and adapted to be manipulated by means of the control knob 106. A suitable electric conductor 162 extends from the switch to the fan, it being understood that the switch 160 is connected to the battery of the vehicle for its source of electricity, the fan being grounded in any suitable manner to complete the circuit. A connection 164 may extend from the switch 160 to a lamp bulb 166, positioned adjacent the control knob 104 to illuminate the same for indicating to the operator that the fan is in operation.

In addition to the slots 108, which are provided in the wedge faces of the underside of the casing 98, a series of downwardly opening louvers 168 may be provided in the front face of the casing 98 but below the level of the radiator core so as to distribute the heated air forwardly as well as laterally of the heater casing. The slots 108 are adapted to be closed by a shutter mechanism indicated generally at 170. The shutter mechanism 170 comprises a plate 172 (see Figures 2 and 3) which is adapted to slide upon the wedge shaped under portion of the casing 98, and is provided with beads 174 extending longitudinally of the casing for facilitating such sliding movement. Bolts 176 secured to the casing 98 have their shanks projecting through slots 178 in the shutter 172 and are encircled by coil springs 182 extending between washers 180 and the upper surface of the shutter 172 so as to hold the shutter 172 firmly against the inner surface of the casing 98 for retaining it in adjusted position. The shutter 172 is provided with slots 184 which are adapted at one limit of movement of the shutter 172 to register with the slots 108 in the casing 98. A handle 186 projects downwardly from the shutter 172 through a slot 188 in the underside of the casing 98 and provides a means for manipulation of the shutter by the operator of the vehicle to open and close the slots 108 for a purpose hereinafter to be described, it being understood that at its other limit of movement the slots in the shutter and casing are out of alinement to prevent passage of air therethrough.

At each side of the lower casing 98 and in vertical side wall 190 thereof, there are provided apertures 192 into which are fitted rubber connectors 194. This connection may readily be made by reason of the resiliency of the rubber connector 194, which is provided with a slot extending therearound and which is simply snapped into place within the aperture 192. The connector 194 may be vulcanized or otherwise suitably secured to a section of flexible tubing 196 which extends upwardly and has connected to its opposite end a nozzle 198. The nozzle 198 is flattened and extended transversely, its ends being provided at 200 (see Figure 3) with attaching flanges apertured for the reception of screws 202 threaded into the instrument panel. Nozzle 198 is provided adjacent the flange 200 with a second flanged portion 204 extending at right angles to the flange 200 to provide a seat for a sealing gasket 206 of rubber or other suitable material which is clamped by means of the screws 202 threaded into a portion 208 of the instrument panel between the flange 200 and the instrument panel.

The instrument panel extends upwardly and forwardly at this point and is joined to the rear edge of the cowl 12 as by welding forwardly of the windshield 24. A rubber gasket 212 has a slot 214 (see Figure 5) in which the flanged and welded edges of the cowl and instrument panel are received, and is provided with a second slot 215 for the reception and retention of the lower edge of the windshield 24. The section 208 of the instrument panel is provided with apertures 216 for connecting the interior of the nozzles 198 with a header 218 formed by an ornamental bead 220 overlying the instrument panel at this point and extending completely across the passenger compartment to the rear of the windshield 24. Bead 220 also serves to hold the windshield gasket 212 in place. The ornamental bead 220 is provided with a series of upwardly opening apertures 222 which are provided with vanes 224 for deflecting the air issuing from the aperture 22 on to the windshield 24. It will be recognized that when it is desired to operate the defrosters in a more efficient manner; that is, to assure large quantities of warm air flowing against the windshield as for the purpose of thawing or melting sleet or ice which is forming thereon, the shutter 172 may be drawn rearwardly by means of the handle 188 to move the slots 184 thereof out of alinement with the slots 108 in the casing 98, thereby baffling and restricting the freedom of flow of the air through the slots 108 and causing pressure to be built up within the casing 98. This excess pressure causes larger quantities of the air to flow through the defroster tubes 196, the nozzle 198, bead 220 and on to the windshield 24 through the slots 222. In normal operation relatively small quantities of air will flow through the tubes 196 and will evaporate any moisture which might normally collect upon the windshield due to the warmer temperature which exists within the car, and it is only necessary to employ the defroster arrangement when unusual weather conditions are met with in the operation of the vehicle.

It will be noted that the instrument panel 14 is at all points spaced from the casing 50 which carries the cold air from the ventilator opening 26 to the heater 110, and for this reason the instrument panel 14 will remain at the temperature of the interior of the vehicle, thus preventing the panel from feeling cold to the touch or becoming clammy due to the condensation of moisture thereon. It will also be understood that suitable gaskets for sound and heat insulation are employed between all metal parts which might otherwise come in contact with one another. Employment of gaskets prevents the transmission of heat therethrough or undue rattling of these parts. The scale which has been chosen to illustrate the device is of too small a nature to permit showing of all such gaskets.

It should also be noted that the plate 88 serves, in addition to supporting the lower heater casing 98 and the heat exchanger 110 and its associated parts, as a baffle for causing all of the air coming through the upper casing 50 to pass through the radiator 110.

The flat wedge shape of the bottom casing 98, besides providing for equal distribution of the air toward both sides of the heater (which is placed centrally of the vehicle in the front compartment thereof), also provides room for the feet of the passengers of the vehicle who will be located upon each side thereof, and permits ready manipulation of the foot pedals such as the accelerator pedal 230.

The use of the two pass or reverse flow radiator has been found to be quite essential in a construction of this nature because of the wide difference between the temperature of the incoming air and the temperature at which it is delivered to the vehicle interior. It has been found that if a single pass radiator is employed, with the water or heating medium simply flowing from one side header to the other side header, the temperature of the entering air stream within the vehicle varies widely across its cross section. By employing a two pass radiator, the heating medium at its point of entry where it is hottest and at its point of exit where it is coolest lie adjacent one another. This arrangement serves to equalize the temperatures of the air discharged therefrom by causing the air to flow first across the coolest portion of the radiator, as upon the right side of Figure 3, and then across the warmest portion. This also has the effect of using the counterflow principle of heat exchange to provide the widest possible difference in temperature between the heating and heated medium. The air flowing through the radiator upon the left side of Figure 3 moves over a portion of the radiator core in which the two passes of the radiator are at about the same temperature. It has been found that a uniform temperature throughout the cross section of the air stream is thus obtained.

The vehicle in which this system is installed will be understood to be of the closed type, and it is in such a vehicle that the system has its greatest utility, although it also has limited utility in connection with open type vehicles. When used in conjunction with a closed vehicle, it is contemplated that the device will be operated with all of the windows closed tightly so as to exclude the possibility of air entering the vehicle in any manner except through the cowl ventilator opening 26. At speeds above 20 miles an hour when not using the fan and at lower speeds when using the fan, it is found that air is brought into the vehicle with all the doors and windows closed in sufficient quantity to create a slightly positive pressure (above atmospheric) within the vehicle. This pressure will range from one to three inches of water and is maintained by the constant induction of large quantities of air into the vehicle through the cowl ventilator. This air pressure, which constantly exists within the car when the heater is in operation, causes all leaks which generally exist around the doors and the windows and in the floor construction to reverse their normal direction of flow so that there is a constant leakage of the warm, vitiated air outwardly through these cracks and crevices. This outward leakage of warm air excludes the possibility of the usual drafts of cold air which are normally present in all cars striking the occupants of the car and causing their discomfort and illness.

The creation of a positive pressure within the vehicle has added utility if the vehicle is to be employed as a gas shelter during poison gas raids as there is no possibility of poison gases leaking into the vehicle, the entire supply of fresh air being drawn in through the cowl ventilator and freed of poison gas by passing it over a suitable filter or absorbing element, such as activated carbon, prior to its discharge into the passenger space.

It is contemplated that the heating device of the present invention will have sufficient capacity to take in and warm to car temperature, quantities of air ranging up to 750 cubic feet of air per minute. The minimum quantity of air taken in, as when the car is standing still with the fan operating, will be in the order of 160 cubic feet per minute. It will be recognized, since the volume of an empty car does not exceed 175 cubic feet, that even at low speeds or when the car is standing still with one or two occupants in the car, a complete change of air is effected at least once a minute, and that at high speeds, that is at 60 miles per hour, four or more air changes are effected every minute. This increase in air changes is useful due to the increased cooling effect of the cold air flowing about the exterior of the car body. These large quantities of air entering the car also serve, in conjunction with the closed condition of the vehicle and the leakage factor previously described, to distribute the warmed air uniformly throughout the car.

It will thus be recognized that a device has been provided which fulfills the objects and partakes of the advantages hereinbefore described, and that this device may readily be installed in vehicles without requiring any major alteration thereof. Although the invention has been described in considerable detail, such description is not to be taken as limiting, but merely as illustrative of the invention and all equivalents falling within the scope of the attached claims are reserved.

I claim:

1. In a combination with an instrument panel, a cowl having a cold air intake opening in its top, and a dash of an automotive vehicle, a heater for warming air taken in through said cowl opening comprising a plenum chamber, and a heating chamber, said plenum chamber being provided with means for separating moisture and foreign particles from the incoming air, a plate supported from said plenum chamber and said instrument panel and supporting the heating chamber, and heating instrumentalities located in said heating chamber, said plenum chamber being located forwardly from said instrument panel, and a warm air outlet from said heating chamber to the interior of the vehicle.

2. In combination with an automobile having a cowl defining an opening and an instrument panel, a casing forming a filter chamber positioned forwardly of said instrument panel and supported from said cowl about said opening, a plate attachable to said casing and the bottom of said instrument panel and defining an opening at the bottom of said casing, a heat exchange unit carried on said plate and registering with the opening therein, a housing attachable to said plate and around said heat exchange unit, and controls for said heat exchange unit mounted on said housing.

3. In an automobile having an instrument panel with a cowl panel extending forwardly therefrom and defining an opening, a heater comprising a plenum chamber supported from said cowl panel around said opening and spaced forwardly from said instrument panel, a plate defining a second opening removably secured to the bottom of said instrument panel and the bottom of said plenum chamber with said second opening registering with said plenum chamber, insulating material positioned between said plate and said plenum chamber, a heater casing removably secured to said plate and defining an opening communicating with the interior of said automobile, and heating instrumentalities positioned within said casing and arranged to heat air passing through said casing from said plenum chamber.

4. In an automobile having an instrument panel with a cowl panel extending forwardly therefrom and defining an intake opening, a heater comprising a plenum chamber supported below said cowl panel and about said intake opening and forwardly of said instrument panel, a plate defining a second opening removably secured to the bottom of said instrument panel and the bottom of said plenum chamber with said second opening registering with said plenum chamber, insulating material positioned between said plate and said plenum chamber, a heater casing removably attached to said plate at points outside of said plenum chamber, said casing defining an opening communicating with the interior of said automobile, and a heat exchanger supported within said casing and in the path of air passing from said plenum chamber through said second opening.

5. In an automobile having an instrument panel with a cowl panel extending forwardly therefrom and defining an intake opening, a heater comprising a plenum chamber supported from said cowl panel and around said intake opening, a plate secured to the lower edges of said instrument panel and plenum chamber, said plate being insulated from said plenum chamber, a casing supported by said plate and communicating with said plenum chamber, and a heat exchanger positioned in said casing in the path of air from said plenum chamber.

6. A heater in combination with an automotive vehicle having an instrument panel and a dash, the heater being spaced forwardly from the instrument panel within the space between the instrument panel and the dash and comprising a cold air plenum chamber supported from an exterior wall of the vehicle, a bracing means removably secured between the bottom of said plenum chamber and the bottom of said instrument panel and a warm air chamber supported below said plenum chamber by said bracing means and arranged to receive air from said plenum chamber.

MEADE F. MOORE.